(12) United States Patent
Juarez et al.

(10) Patent No.: US 12,182,821 B1
(45) Date of Patent: *Dec. 31, 2024

(54) METHOD AND SYSTEM FOR IMPROVING SECURITY OF FINANCIAL TRANSACTIONS

(71) Applicant: UIPCO, LLC, San Antonio, TX (US)

(72) Inventors: Maximiliano C. Juarez, Helotes, TX (US); Paul Joseph Oncale, III, Cibolo, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/651,120

(22) Filed: Feb. 15, 2022

Related U.S. Application Data

(63) Continuation of application No. 16/372,550, filed on Apr. 2, 2019, now Pat. No. 11,288,675.

(60) Provisional application No. 62/734,296, filed on Sep. 21, 2018.

(51) Int. Cl.
*G06Q 20/40* (2012.01)
*G06Q 20/32* (2012.01)

(52) U.S. Cl.
CPC ....... *G06Q 20/405* (2013.01); *G06Q 20/3224* (2013.01)

(58) Field of Classification Search
CPC .......................... G06Q 20/405; G06Q 20/3224
See application file for complete search history.

(56) References Cited

U.S. PATENT DOCUMENTS

| 7,814,016 | B2 | 10/2010 | Pranger | |
| 8,185,457 | B1 * | 5/2012 | Bear | G06Q 40/02 |
| | | | | 705/37 |
| 8,745,698 | B1 * | 6/2014 | Ashfield | H04L 63/08 |
| | | | | 726/4 |
| 10,614,464 | B2 * | 4/2020 | Matthews | G06Q 20/40 |
| 10,664,845 | B1 | 5/2020 | Lambert et al. | |
| 10,942,997 | B2 * | 3/2021 | Kao | G06F 21/32 |

(Continued)

OTHER PUBLICATIONS

Final Office Action mailed Oct. 26, 2020 in U.S. Appl. No. 16/372,550.

(Continued)

*Primary Examiner* — Scott S Trotter
*Assistant Examiner* — William D Newlon
(74) *Attorney, Agent, or Firm* — Plumsea Law Group, LLC

(57) ABSTRACT

A system and method for improving the security of financial transactions is disclosed. The system and method include an account management tool where customers (or account holders) can manage financial control settings, which include controls to set limits on the frequency of financial transactions and/or maximum transaction amounts. Based on these user-selected control settings, a financial account provider can deny transactions that exceed limits determined from the financial control settings. The system and method include a setting for geographic location, so that a user may build a customized list of geographic regions where transactions are allowed or prohibited. The system and method also include a setting for companies or merchants, so that a user may build a customized list of companies or merchants where transactions are allowed or prohibited.

20 Claims, 11 Drawing Sheets

(56) References Cited

U.S. PATENT DOCUMENTS

| | | | |
|---|---|---|---|
| 11,523,087 B2* | 12/2022 | Taylor | H04N 5/265 |
| 11,750,386 B1* | 9/2023 | Vo | H04L 63/0807 |
| 2005/0263588 A1 | 12/2005 | Babi et al. | |
| 2008/0140575 A1* | 6/2008 | Cannady | G06Q 20/403 |
| | | | 705/67 |
| 2009/0152343 A1 | 6/2009 | Carter et al. | |
| 2013/0091042 A1 | 4/2013 | Shah et al. | |
| 2014/0012733 A1 | 1/2014 | Vidal | |
| 2014/0172707 A1* | 6/2014 | Kuntagod | G06Q 20/3224 |
| | | | 705/44 |
| 2014/0358704 A1 | 12/2014 | Banerjee et al. | |
| 2015/0067808 A1* | 3/2015 | Varghese | G06F 21/32 |
| | | | 726/7 |
| 2016/0019543 A1* | 1/2016 | Taylor, III | G06Q 20/40 |
| | | | 726/5 |
| 2017/0091765 A1* | 3/2017 | Lloyd | G06Q 20/321 |
| 2020/0090178 A1* | 3/2020 | Vadhri | G06Q 20/405 |
| 2020/0380506 A1* | 12/2020 | Chang | H04L 63/0876 |

OTHER PUBLICATIONS

Non-Final Office Action mailed May 19, 2021 in U.S. Appl. No. 16/372,550.
Notice of Allowance mailed Nov. 24, 2021 in U.S. Appl. No. 16/372,550.
Non-Final Office Action mailed Apr. 28, 2020 in U.S. Appl. No. 16/372,550.

* cited by examiner

| MY ACCOUNTS | SETTINGS | CLAIMS | MY OFFERS |

IF YOU NEED HELP SETTING YOUR PREFERENCES, ANSWER THE QUESTIONS BELOW AND WE WILL PROVIDE RECOMMENDATIONS

PRODUCT [ATM WITHDRAWALS ▾]

DO YOU PLAN TO TRAVEL OUTSIDE OF THE COUNTRY IN THE NEXT 6 MONTHS?
⦿ NO   ○ YES

DO YOU PLAN TO TRAVEL OUTSIDE OF YOUR CURRENT STATE IN THE NEXT 6 MONTHS?
○ NO   ⦿ YES

DO YOU EXPECT TO NEED MORE THAN $500.00 FROM AN ATM IN THE NEXT 6 MONTHS?
⦿ NO   ○ YES

DO YOU WANT TO BE NOTIFIED EVERY TIME A CHANGE IS MADE TO THESE SETTINGS?
⦿ NO   ○ YES

[ GO ]   CLICK TO SEE RECOMMENDED SETTINGS

FIG. 7

METHOD AND SYSTEM FOR IMPROVING SECURITY OF FINANCIAL TRANSACTIONS

CROSS-REFERENCE TO RELATED APPLICATIONS

This application is a continuation of and claims priority to U.S. application Ser. No. 16/372,550, filed Apr. 2, 2019, titled "Method and System for Improving Security of Financial Transactions," which application claims the benefit of Provisional Patent Application No. 62/734,296 filed Sep. 21, 2018, and titled "Method and System for Improving Security of Financial Transactions," the disclosures of these applications are hereby incorporated by reference herein in their entirety.

TECHNICAL FIELD

The present disclosure generally relates to methods and systems for improving the security of financial transactions, and more specifically to methods and systems that allow a user of a financial account increased control over financial transactions for their account.

BACKGROUND

Customers of financial institutions may find themselves the victims of various kinds of fraud, including banking and credit fraud. The customer's financial information, including their login credentials, debit card information and/or credit card information may be acquired by an unauthorized third party through institutional data breaches or social engineering. Typically, customers have little control over financial transactions made using their account numbers, credit cards or other credentials. Once a fraudulent transaction is identified, customers often have little recourse but to cancel associated debit/credit cards and monitor future financial transactions linked to their financial assets. Both of these options are inconvenient and may be ineffective in mitigating future risk.

There is a need in the art for a system and method that addresses the shortcomings discussed above.

SUMMARY

In one aspect, a method of improving the security of financial transactions includes the steps of receiving a financial transaction request, retrieving a user-selected allowed geographic region, receiving a transaction location associated with the financial transaction request, and denying the financial transaction request when the transaction location is not located within the user-selected allowed geographic region.

In another aspect, a method of improving the security of financial transactions includes the steps of receiving a financial transaction request, the financial transaction request being associated with a company, retrieving a list of user-selected prohibited companies, and denying the financial transaction when the company is in the list of user-selected prohibited companies.

In another aspect, a method of improving the security of financial transactions includes the steps of prompting a user to provide a first type of authentication, providing the user with a financial transaction control setting in response to receiving the first type of authentication from the user, and receiving a request to change the financial transaction control setting. The method also includes prompting the user to provide a second type of authentication, changing the financial transaction control setting in response to receiving the second type of authentication from the user, and preventing the financial transaction control setting from being changed when the user fails to provide the second type of authentication.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 3-7 are schematic screenshots from an online account webpage where a user can monitor and/or control various settings related to financial transactions, according to an embodiment;

DESCRIPTION OF EMBODIMENTS

The embodiments provide increased security for users with financial accounts. This increased security is achieved using a system and method that gives users (for example, customers of a financial institution) increased control over financial transactions for any accounts they own. These financial controls include the ability to set limits on wire transfers, ATM withdrawals, online banking transactions, stock purchases and other types of financial transactions. These financial controls also include the ability to designate particular geographic regions where financial transactions may be allowed or not allowed (for example, through geofencing). These financial controls also include the ability to designate specific merchants or points of sale where transactions are allowed or not allowed. These financial controls also include the ability to select the type of authentication that is required for some actions. For example, a user may choose to turn-on a video identification feature for authenticating changes to financial control settings. This would require the user to present himself or herself on a video chat with an account management representative in order to authorize any future changes to the financial controls.

By providing users with various kinds of control settings, the present embodiments allow users to reduce their financial risk before, during, and after unauthorized financial activity associated with one or more of the user's accounts has occurred. More specifically, by providing users with the ability to set thresholds for the number and/or amount of transactions, the embodiments help reduce the total financial loss that a user may experience due to fraudulent transactions. Furthermore, by providing users with the ability to control the geographic regions and/or specific companies where transactions are allowed (or not allowed), the embodiments reduce the risk of fraudulent activity, as such activity may be more likely to occur in certain geographic regions and/or at certain stores. Also, by providing users with increasing levels of authentication, the embodiments can help provide a balance between increased security measures (in the form of transaction limits, etc.) and convenience, as the user may only be prompted to provide higher levels of authentication for rare transaction events (for example, to perform an unusually large transaction) or to change control settings.

Figure 1:
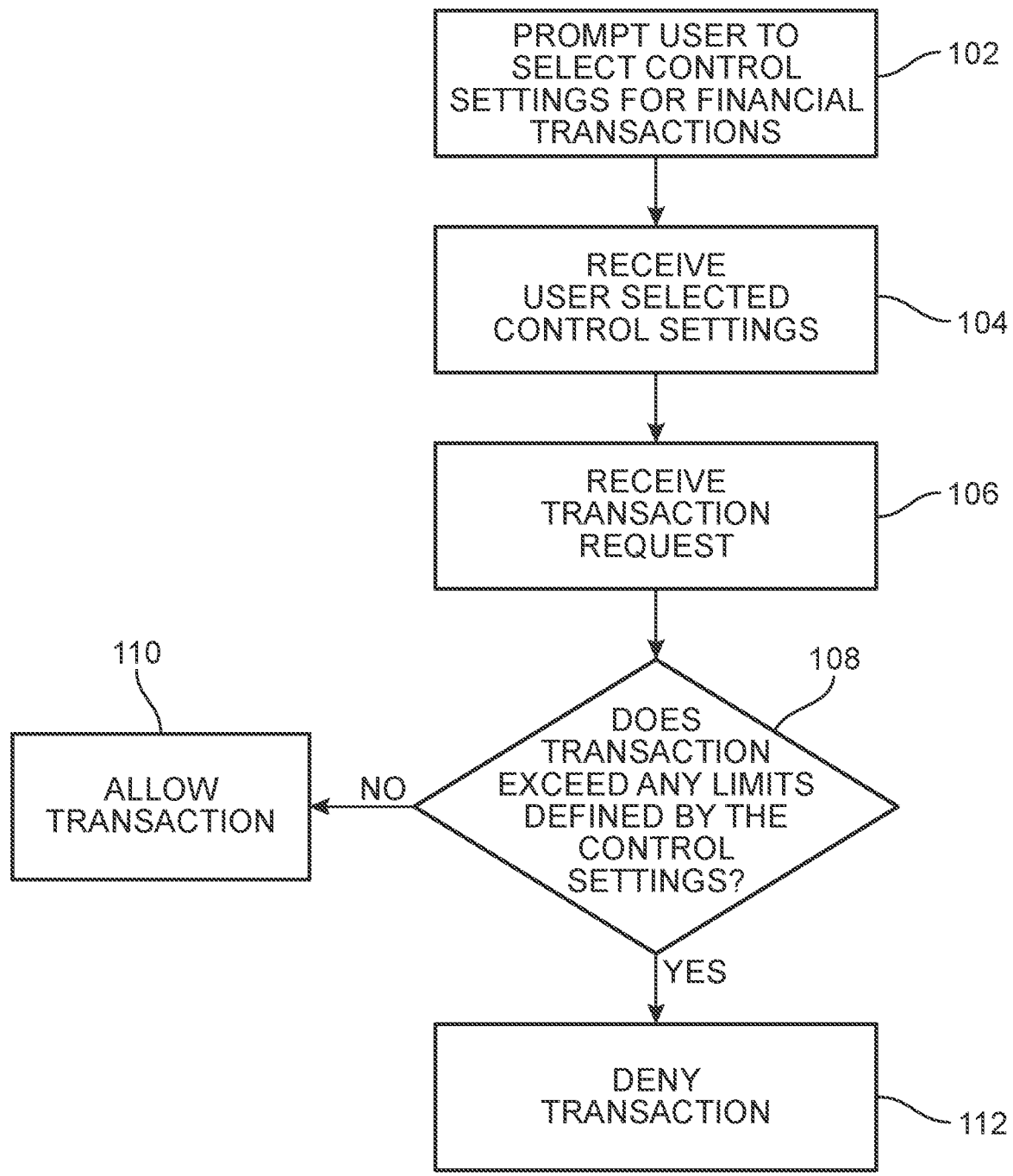
FIG. 1 is a schematic view of a process where a user can select control settings for financial transactions, according to an embodiment.

FIG. 1 is a schematic view of a process for controlling financial transactions with user-selected financial control settings, according to an embodiment. In the present embodiment, one or more of the steps in this process may be performed by a financial account provider. The term "financial account provider" (or simply "provider"), as used herein, refers to any institutions or companies that provide financial accounts, including, but not limited to: banks and credit companies. In some cases, a financial account provider is the issuing bank that issues credit cards (or bank cards) to an account holder.

Referring to FIG. 1, at step 102, a financial account provider may provide a customer with the ability to add or change various financial control settings specific to a particular type of financial transaction. As used herein, a type of financial transaction (or a "financial transaction type") includes various kinds of transaction methods and services that may be available to account holders. These include, but are not limited to: money wires, ATM withdrawals, credit card purchases, lines of credit, loans, stock transactions (for example, buying or selling stock), and fund transfers (external or internal to the account holder's bank or financial institution).

Each financial transaction type may be associated with one or more financial control settings. As used herein, a financial control setting refers to any optional settings, including restrictions and notifications, that an account holder can set for a particular type of financial transaction. One example of a financial control setting is the option to turn off all access to a particular type of transaction. For example, some embodiments may provide users with the ability to turn off wires, ATM withdrawals, access to home equity lines of credit and stock purchases and sales. Another example of a financial control setting is the option to set a maximum transaction amount. For example, some embodiments may provide users with the ability to set maximum transaction amounts for wires, ATM withdrawals, credit card purchases, home equity lines of credit, internal and external fund transfers and stock sales and purchases. Another example of a financial control setting is the option to set so-called "velocity restrictions" on some kinds of transactions. Velocity restrictions are generally provided as a limit on the number of transactions that can occur within a selected period (for example, per day, per week or per month). For example, some embodiments may provide users with the option to set velocity restrictions on wires and fund transfers. Another example of a financial control setting is the option to schedule transaction notifications. For example, some embodiments may provide users with the option to schedule transaction notifications whenever wires are sent, whenever lines of credit are opened or changed, whenever fund transfers occur and whenever stocks are purchased or sold. Another example of a financial control setting is the option to limit transactions at specific locations. For example, some embodiments may provide users with the option to place location restrictions on wires, ATM withdrawals and credit cards.

It may be appreciated that the financial control settings of the embodiments are optional settings that have been selected by a user. These control settings may be contrasted with default restrictions, such as a maximum amount for a single wire transfer, that are imposed by the financial account provider. The default restrictions are often designed to be broad enough to avoid inconveniencing the average user. By providing adjustable control settings, the present embodiments allow users who want to lower their risk profile to increase restrictions compared to the default restrictions.

In some embodiments, control settings may be applied to financial products, rather than individual financial transactions. For example, some embodiments can include user adjustable control settings for insurance products (for example, auto, property and life insurance products). In some embodiments, user adjustable control settings could be set for new accounts. For example, a user may turn off the ability to automatically create new (and possibly linked) financial accounts online to prevent unauthorized users from creating new accounts and draining the user's original account through internal fund transfers.

At step 104, the provider may receive one or more user-selected control settings. In some embodiments, both step 102 and step 104 could be accomplished using a webpage or could be accomplished using a native application for a remote device. Additional details of systems and methods for providing control options and receiving user-selected control settings are discussed in further detail below with respect to FIG. 2.

Sometime after a user has selected customized financial control settings, a provider may receive a financial transaction request associated with a financial transaction for one of the user's accounts at step 106. As used herein, the term "financial transaction request" includes any message to a provider that requests the provider to authorize a transaction, such as a credit card payment or ATM withdrawal. Other examples of financial transaction requests could include authorization for a wire transfer or stock purchase.

Generally, if the provider authorizes a financial transaction request, the associated financial transaction is allowed. If the provider does not authorize the financial transaction request, the associated financial transaction is denied (or not allowed).

The financial transaction request may comprise one or more messages including information about a given financial transaction. These messages can include information about the transaction type (for example, a wire, an ATM withdrawal, etc.), the amount of money being transacted, the location of the transaction, the company or other party transacting with the user as well as possibly other kinds of information. This information can be provided in any known format for payment processing. In some embodiments, some of the financial transaction information is provided in the form of predefined codes, including codes for location, merchant, and transaction type.

In step 108, the provider may check to see if any aspects of the transaction (for example, the type of transaction, the transaction amount, and the transaction location) exceed any limits defined by the user-selected control settings. These settings include information about limits that the user has placed on, for example, transaction amounts for a given type of transaction and/or transaction locations.

If the provider determines during step 108 that the transaction does not exceed any limits defined by the control settings, then the provider allows the transaction in step 110. Otherwise, the provider proceeds to step 112 where the transaction is denied.

Figure 2:
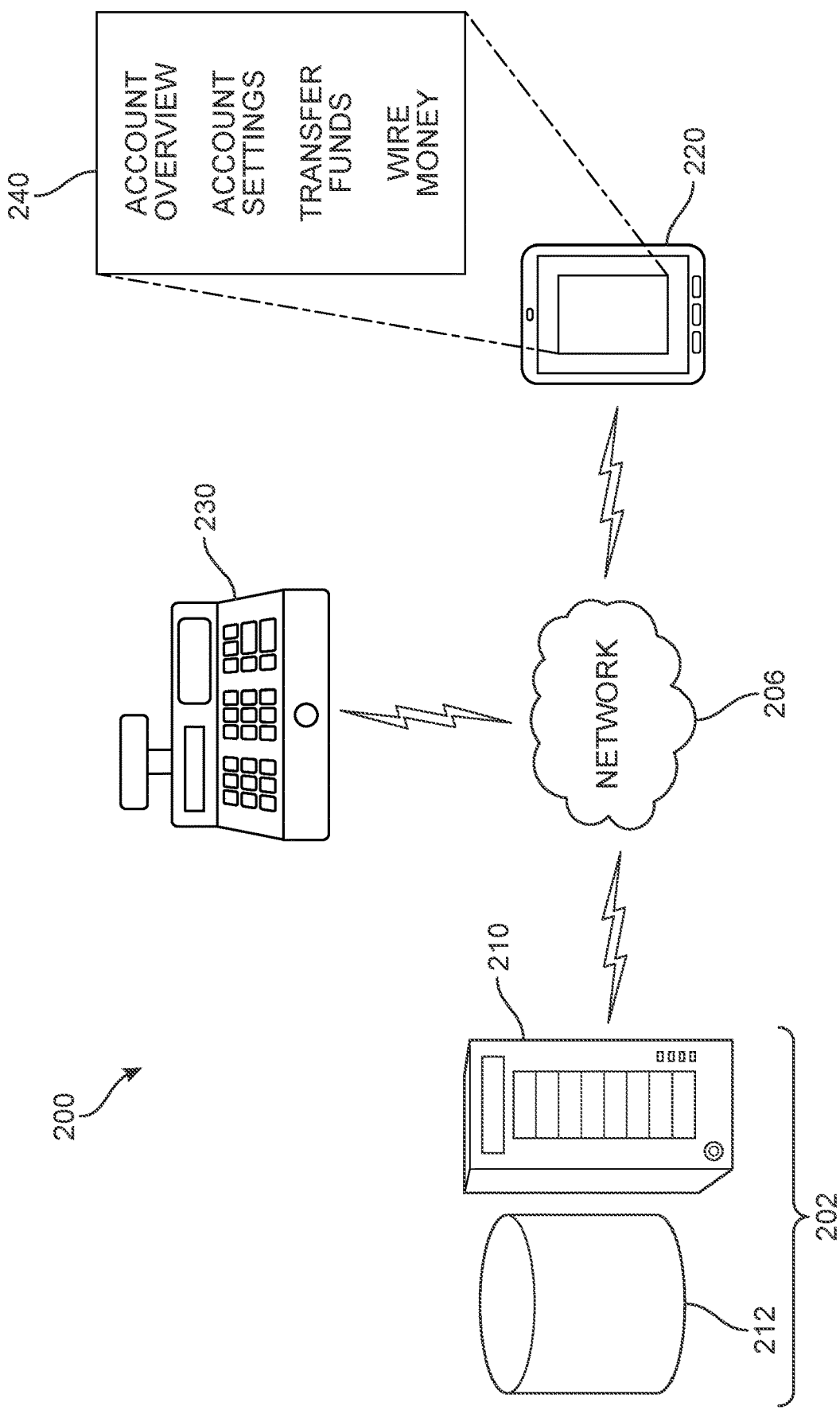
FIG. 2 is a schematic view of a system where a user can set limits on financial transactions, according to an embodiment.

Referring to FIG. 2, a financial transaction management system 200 (also referred to simply as "management system 200") may communicate with a remote device 220 and/or other points of sale 230 through a network 206. Financial transaction management system 200 may be associated with a financial account provider and may include subsystems for processing financial transactions, as well as for providing financial transaction controls and facilitating mobile payments and/or transfers.

Management system 200 may comprise a centralized computer system 202. The term "computer system" refers to the computing resources of a single computer, the partial computing resources of a single computer, a plurality of computers communicating with one another, or a network of remote servers. In an exemplary embodiment, computer system 202 includes at least one server.

In the embodiment of FIG. 2, centralized computer system 202 comprises one or more computing devices 210 (for example, a server) that may be in communication with one or more databases 212. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

Remote device 220 may comprise a computer system for processing and communicating information. A remote device may generally include a processor, a data storage component and a display. A remote device may also include components to facilitate communication with external systems (for example, hardware and software components to enable communication over network 206). In some cases, a remote device includes one or more physical buttons. In some cases, a remote device includes touchscreen controls.

In the exemplary embodiment of FIG. 2, remote device 220 comprises a mobile device. Specifically, remote device 220 comprises a tablet computing device. In other embodiments, however, a remote device could comprise a smartphone, a laptop, a desktop computer, or similar kind of device.

A remote device and a centralized computer system could operate in a client-server relationship. For example, centralized computer system 202 may include a server that communicates with remote device 220 as well as other remote devices over network 206. Remote device 220 may provide the front-end of a system that provides users with options for making online financial transactions (for example, wires or mobile-to-mobile payments). In some cases, remote device 220 may run client software through a web browser, in which case the client software may be hosted on a server associated with centralized computer system 202. In other cases, remote device 220 may run client software in the form of a native software application that has been downloaded through a centralized marketplace (i.e., an "app store"). In some cases, while the client software that allows users to access financial control settings and other account options may run on remote device 220, the data may be retrieved from and stored on databases associated with centralized computer system.

As one example, remote device 220 may be configured with a banking software application 240. In this example, banking software application 240 allows a to review their account balances, review and/or change their account settings, transfer funds and/or wire money.

Remote device 220 may include provisions for determining a current location for the device. In some embodiments, remote device 220 includes a GPS receiver used to determine a GPS location. In some embodiments, remote device 220 may determine the current location using information received from cell phone towers (such as a cell ID) and/or received signal strength indication from WiFi signals. In some embodiments, an application running on remote device 220, such as banking software application 240, may have access to location information for remote device 220. This application can then send location information for remote device 220 to centralized computer system 202 over network 206.

A point of sale 230 can include any originator of a financial transaction. Points of sale can include, but are not limited to credit card or debit card transactions at retailers/merchants (including online vendors) and other service providers. In addition to financial transactions that originate through credit card or debit card purchases, management system 200 may also receive requests for financial transactions in the form of ATM withdrawals, mobile-to-mobile payments, bank wires, stock purchases, and fund transfers.

The arrangement depicted in FIG. 2 therefore allows a user to set control settings for financial transactions using native software applications or browser applications running on a remote device 220, where these applications are provided as a front-end interface for part of the financial transaction management system 200. The arrangement also allows management system 200 to process financial transactions from various points of sale 230 and/or mobile banking or payment applications. And the arrangement allows management system 200 to deny financial transactions when those transactions do not meet limits or other controls set by the user.

FIGS. 3-7 depict schematic views of various financial controls that can be provided to a user. These controls may be presented to a user through a native software application running on a remote device or other computing device (i.e., banking software application 240 of FIG. 2), such as a phone or tablet, and/or through a website running on a browser. In some cases, these financial controls are provided with other account management tools that are accessible to users of services offered by a financial account provider.

Referring to FIGS. 3-7, an account management section 300 available to a user can provide a user with a set of possible financial transaction controls for different kinds of financial transactions. In some cases, a user may be required to login (provide some form of authentication, such as a password) to have access to account management section 300. Account management section 300 presents the user with multiple control settings for different financial transaction types or for different financial products.

Figure 3:
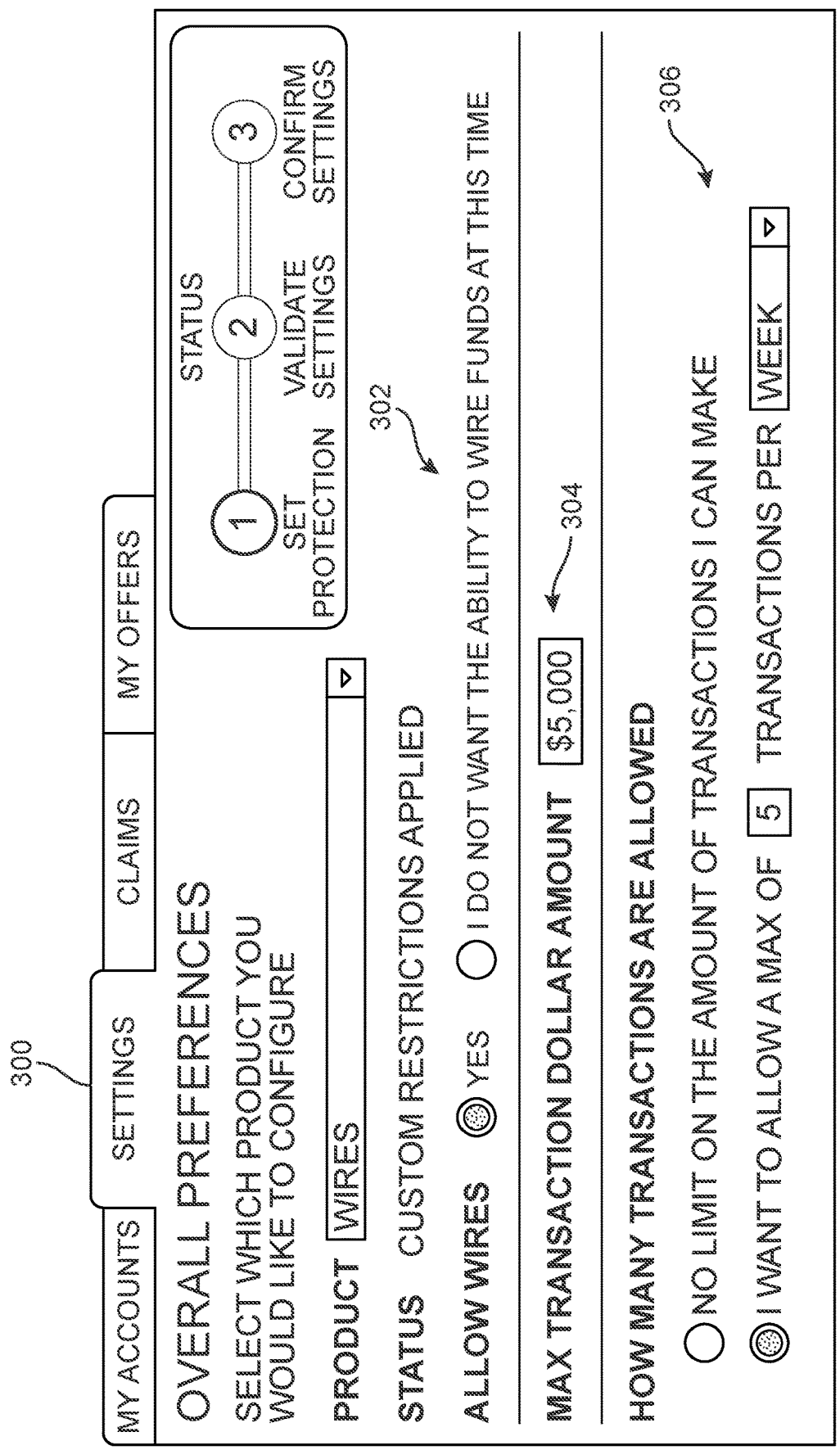

As seen in FIG. 3, a user may select a transaction type (or a financial product) to view a list of control options. In FIG. 3, "wires", referring to money wires, which may be available through a mobile banking application, is selected. A first control setting 302 can be set to "allow wires" or prevent wires. In some cases, if the option for preventing wires is selected, further selections may be hidden within the user-interface.

With the "allow wires" option for control setting 302 selected, a user can further control the maximum transaction amount (set to $5,000 in the example) using control setting 304. Additionally, a user may control the maximum frequency (or velocity) of transactions (5 per week in the example) using control setting 306.

Although FIG. 3 depicts the menu for wire-type transactions, a user may also have the ability to select other types of financial transactions (or products) for control. These include any of the types of financial transactions already discussed above, such as, but not limited to: ATM withdrawals, debit transactions, credit card transactions, checks and request for loans. For each different type of transaction, the available control settings may be suitably adapted. These also include settings for various financial products such as insurance products.

Figure 4:
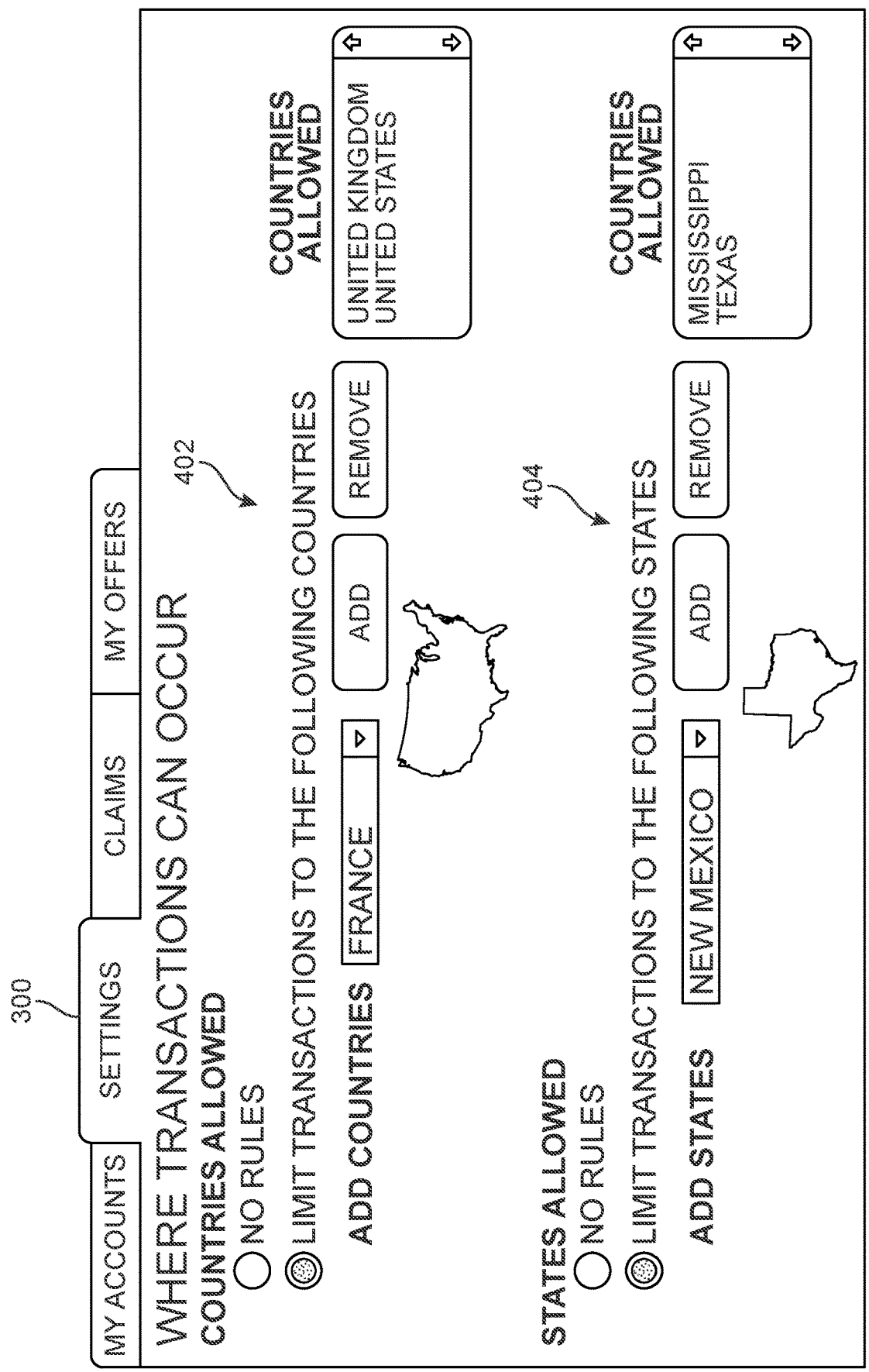

Referring to FIG. 4, account management section 300 may provide controls that allow users to limit transactions according to geographic region. As used herein, the term "geographic region" may refer to countries, states, cities as well as any other well defined geographic region. Geographic regions could be predefined regions provided by the financial management system, or customized regions defined by a user.

In the example, a user can select each country where they would like financial transactions to be available using control setting 402. In this case, a user has selected to allow financial transactions in the U.S. and the U.K. The set of selected countries effectively becomes a "white list" of countries where transactions are allowed. All other countries implicitly become part of a "black list" of countries where transactions are not allowed.

In the exemplary embodiment, a user is further able to select states within some countries where transactions are allowed using control setting 404. In this case, a user has chosen to allow financial transactions in Mississippi and Texas. In some cases, the user could select states where he or she lives, or plans to travel to, in the future.

Optionally, the user could have selected to have no rules on countries or states, as indicated by the available toggle options for control setting 402 and control setting 404. Such an option may appeal to users who travel frequently to different destinations.

Although the exemplary embodiments depict geographic regions defined at the country and statewide levels, it is conceivable that geographic regions for county, city or still more local levels could also be made available. However, because such options would require users to be more familiar with city and county boundaries, these options might not be suitable for all users.

Although the embodiments depict a system where users select geographic regions where transactions are allowed, other embodiments could have users select only regions where transactions are not allowed. That is, the system could be set up to have users build a "blacklist" of geographic regions, with all other geographic regions being allowed by default.

To reduce the ability of an unauthorized user to disable/override various financial transaction control settings, a system may incorporate controls associated with user authentication. Specifically, a system may allow a user to turn on additional authentication methods that would be required when changes to financial transaction control settings are requested. Moreover, these additional authentication methods may be more secure than authentication methods used to access the account management section.

Figure 5:
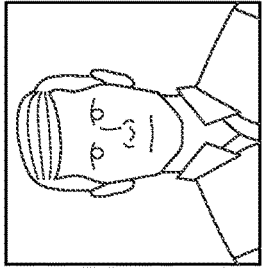

Referring to FIG. 5, account management section 300 can include control settings associated with user authentication. Specifically, control setting 502 allows a user to turn-on visual confirmation. This requires a user to take part in a video chat with an authorized representative who can, after confirming the user looks like a picture on file, give the user permission to make changes to the transaction control settings. In addition, control setting 504 allows a user to designate that only specific devices can be used to gain access to a user's account and/or change transaction control settings. Authentication controls, including the option to turn on camera or video verification, can be used with various types of financial transactions. These include, but are not limited to: wires, opening to changing lines of credit, taking out loans, stock sales and purchases and fund transfers.

In other embodiments, other kinds of authentication methods could be used to allow changes to financial control settings. These include, but are not limited to, voice authentication, biometric authentication, two-factor authentication methods as well as other suitable authentication methods.

These additional security settings can help reduce the ability of an unauthorized user to make changes to financial transaction control settings. For example, even if an unauthorized user were to gain access to a user's account management section using stolen account login credentials, the unauthorized user may fail the additional authentication methods (for example, visual confirmation or confirmation that he or she is accessing the account from a designated device). This would prevent the unauthorized user from changing the transaction control settings, thereby maintaining the increased security measures provided by these control settings.

Figure 6:
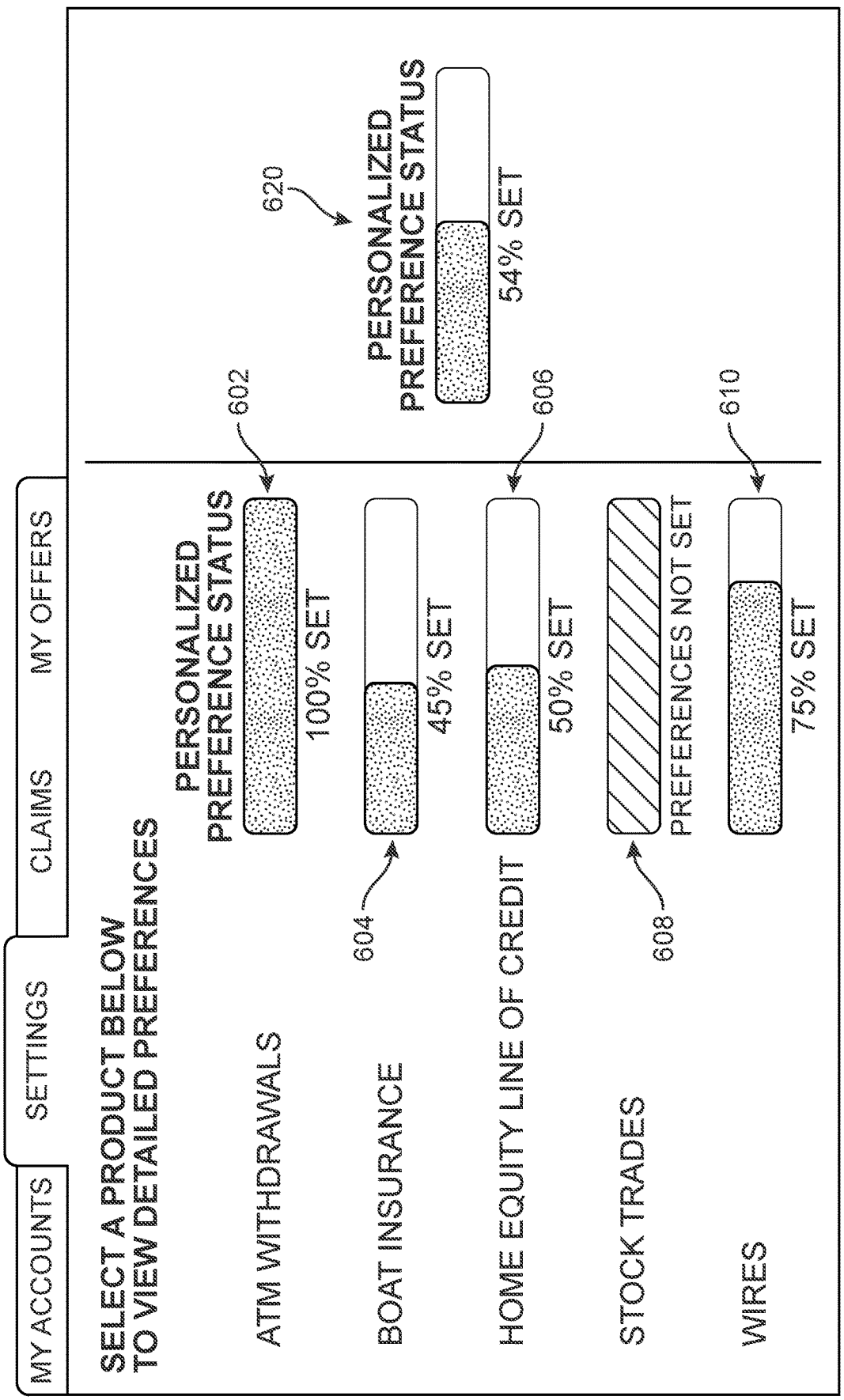

As seen in FIG. 6, in some embodiments an account management section can provide a user with a visual indicator of their control setting status. The control setting status provides a visual indicator of how many control settings have been enabled relative to the number of available control settings. As an example, if a particular financial type of transaction has four different control settings, the control setting status could have values of 0%, 25%, 50%, 75% and 100% depending on whether the user has enabled 0, 1, 2, 3 or all 4 of the optional control settings for that transaction type.

In the example depicted in FIG. 6, a user has enabled at least some controls on ATM withdrawals 602, boat insurance 604, home equity line of credit 606, and wires 610. However, the user has not enabled any controls for stock trades 608. This list allows a user to quickly see which financial transactions may be most vulnerable to unauthorized users (the most vulnerable generally being the products where the fewest number of control settings have been established). Moreover, the user is also provided with an overall control setting status 620 that provides a quick visual indication about the overall level of optional financial controls that have been enabled.

In order to help users determine the optimal control settings, a financial account provider may incorporate a control setting recommendation system. A control setting recommendation system may receive inputs from a user and provide suggested control settings that are optimized for the user's particular situation. For example, referring to FIG. 7, an account management section can include a settings recommendation form 700. Recommendation form 700 provides a user with questions in order to obtain relevant information about a user's financial preferences and habits. Based on the user's responses to these questions, recommended control settings for various transaction types can be provided. As an example, if a user indicates that he or she rarely has a need to wire money, the recommendation system could suggest the user simply turns off wires (using, for example, the control settings depicted in FIG. 3).

Figure 8:
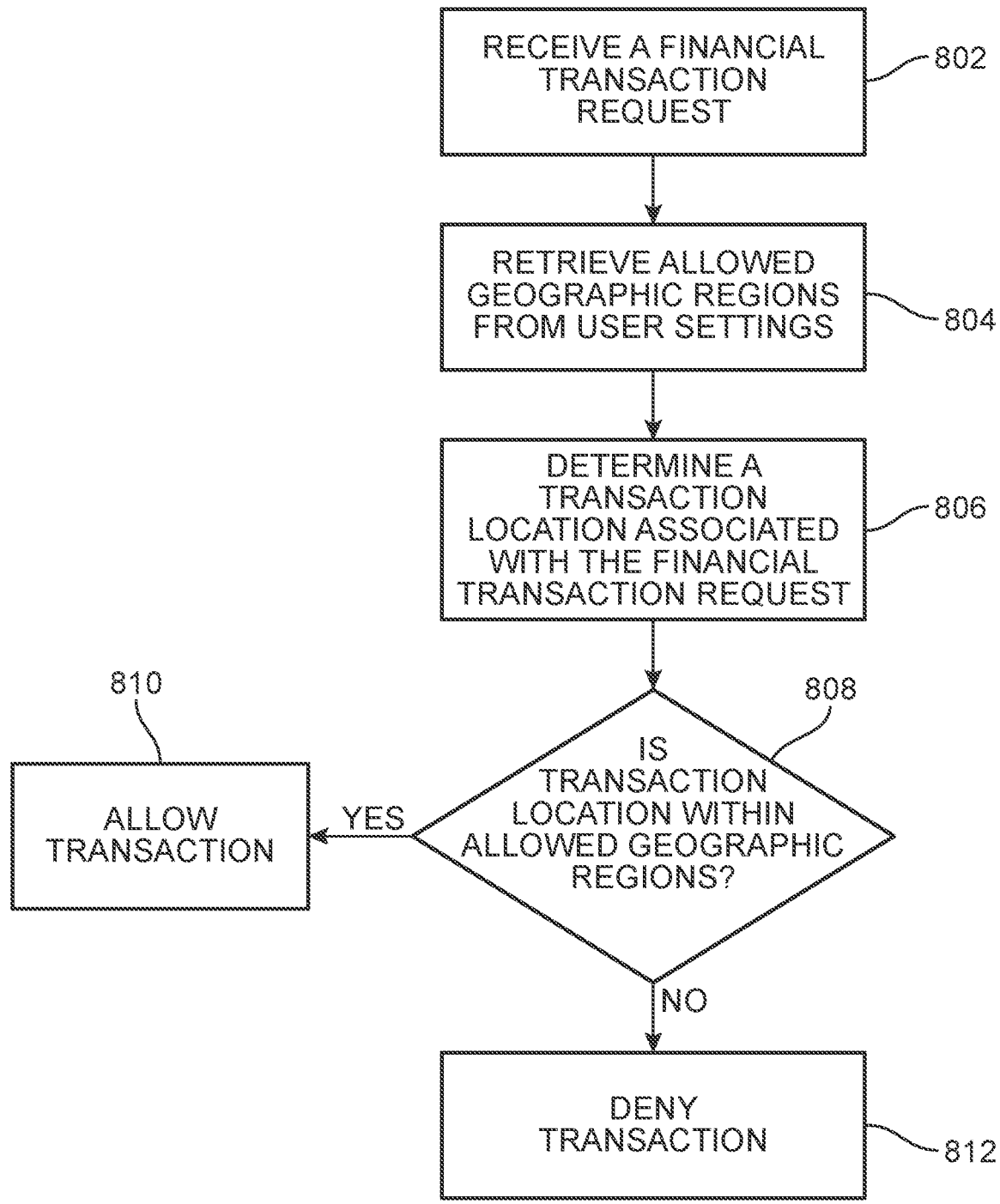
FIG. 8 is a schematic view of a process for controlling a financial transaction according to a location of the financial transaction and user-selected settings, according to an embodiment.

FIG. 8 is a schematic view of a process for controlling financial transactions according to user-selected geographic settings. In the present embodiment, one or more of the steps in this process may be performed by a financial account provider.

In step 802, a provider may receive a financial transaction request. If the service is a credit card transaction, the transaction request may be passed from the point of sale (for example, a merchant) to an acquiring bank (or its processor), and finally to the account provider (for example, an issuing bank of a credit card). In other cases, the transaction request may take place within the account provider's own systems (for example, fund transfers may originate within the account provider's system).

In step 804, a provider retrieves a list of allowed geographic regions. This list may comprise geographic regions a user has selected when enabling financial control settings, as in FIG. 4.

In step 806, a provider may determine the location for the current transaction request. The location for a transaction can be determined in different ways. In some embodiments, the financial transaction request may include information about the location where the transaction is taking place. For example, some transaction requests may include codes or tags that provide geographic information for the point of sale (for example, a merchant's address). In other embodiments, a provider may be able to determine the GPS location of a user by querying his or her phone for a current location.

In step 808, the provider determines if the current location of the transaction is within one of the listed geographic regions. If not, the provider proceeds to step 810 to deny the transaction. If, on the other hand, the current location is within one of the listed geographic regions, then the provider will deny or reject the transaction request at step 812.

The exemplary method helps reduce a user's exposure to financial losses from unauthorized transactions by reducing the number of places where a user might be exposed to fraudulent activity. Moreover, by providing settings at both the country and state level, the method allows different users to select their preferred balance between risk and convenience. For example, users who travel less frequently within a country can enable restrictions at the statewide level, while users who travel widely within a country may choose not to enable restrictions at the statewide level while still enabling restrictions at the country level.

Figure 9:
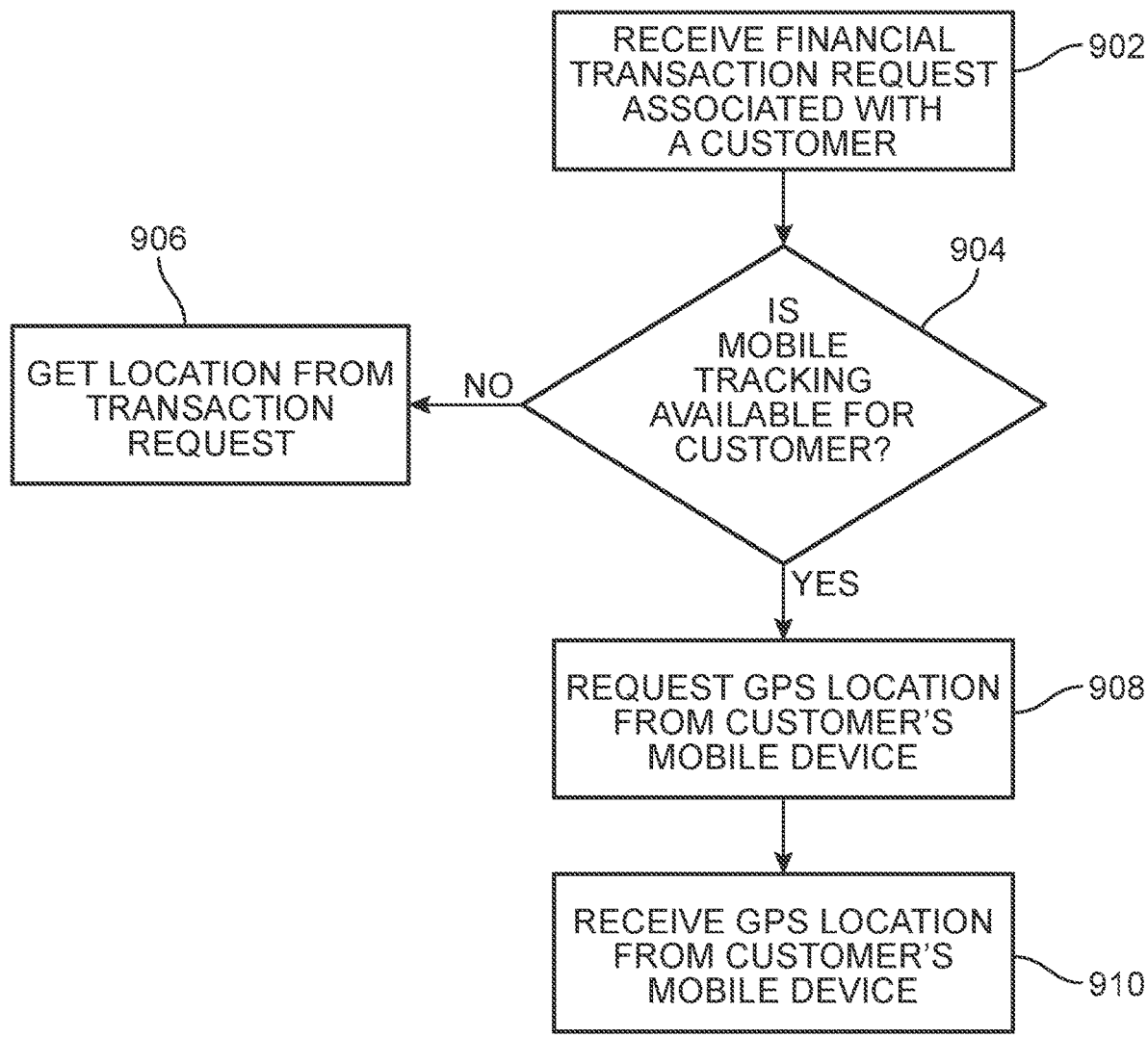
FIG. 9 is a schematic view of a process for acquiring the location of a remote device of a user making a financial transaction, according to an embodiment.

FIG. 9 is a schematic view of a process for obtaining location information (for example, a GPS position) from a customer's (or more generally, a user's) remote device to restrict financial transactions using geo-fencing. In step 902, the provider receives a financial transaction request. Next, in step 904, the provider determines if mobile tracking (that is, a GPS location or other location information) is available for a customer (user). In some cases, GPS location tracking may be an option that can be enabled by a customer. If GPS location information is not available, the provider proceeds to step 906 to determine the transaction location from information within the transaction request itself. If GPS location information is available, the provider requests the current GPS location for the customer's remote device at step 908, and then receives the GPS location from the remote device at step 910.

Although the process depicted in FIG. 9 includes obtaining GPS location information where available, a similar process applies for other kinds of location information that can be achieved using hardware and software available on most remote devices. That is, a similar process applies for methods of receiving location information obtained using information from cell towers and/or WiFi signal strength information.

It may be desirable to request location information from a user's remote device even when location information is provided directly in the financial transaction request. It may occur that the location information tagged in the transaction request is associated with the location of the payment processor, or other financial intermediary, rather than the location where the transaction itself is originating. In such scenarios, obtaining location information directly from a user's device may provide a secondary check or confirmation on the transaction location.

Figure 10:
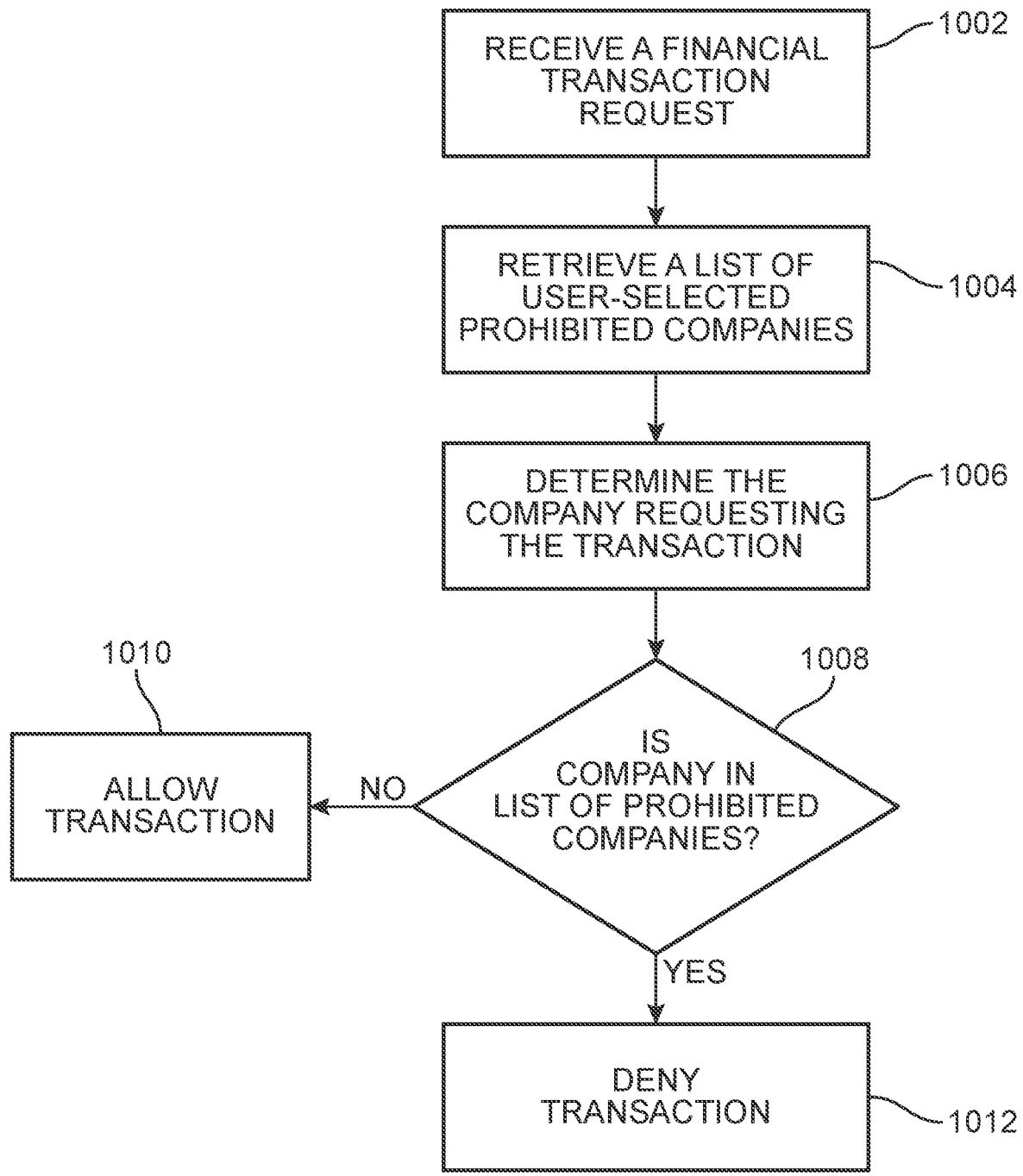
FIG. 10 is a schematic view of a process for controlling a financial transaction based on the company originating the financial transaction, according to an embodiment.

FIG. 10 is a schematic view of a process for restricting financial transactions based on user-selected lists of prohibited companies, merchants or other points of sale. In step 1002, the provider receives a financial transaction request. Next, in step 1004, the provider retrieves a list of user-selected prohibited companies. The companies in this list may be selected by a user through a similar control menu to that shown in FIG. 4 for geographic regions. That is, the user could be provided with a list of companies and the user can build a list of companies where they do not want financial transactions (like credit card or debit card transactions) to be allowed.

Next, in step 1006, the provider determines the company where the current transaction is taking place. Generally, this information may be provided as part of the initial financial transaction request. In step 1008, the provider determines if the current company where the transaction is taking place is on the list of prohibited companies. If not, the provider proceeds to step 1010 to allow the transaction. Otherwise, if the company is on the list of prohibited companies, the provider denies the transaction at step 1012.

Figure 11:
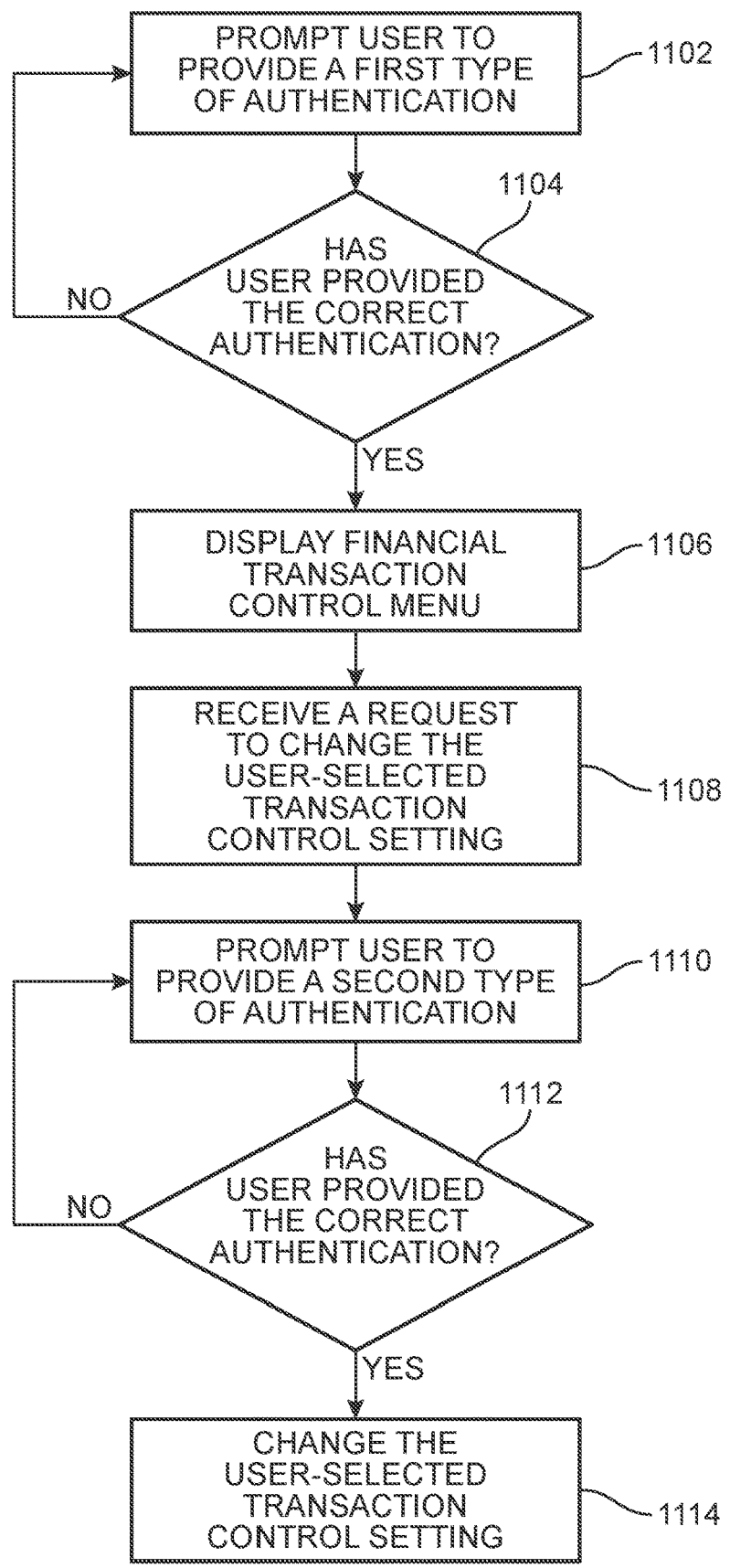
FIG. 11 is a schematic view of a process for requiring a user to meet multiple levels of authorization to change any financial transaction settings previously set on their account.

FIG. 11 is a schematic view of an authentication process for allowing a user to change one or more financial control settings. The process may begin when a user logs into an online session for accessing their financial account information and management settings. In step 1102, a provider prompts a user to provide a first type of authentication. This first type of authentication could include a user's login ID (for example, an email or username) and a password. If the user provides the correct authentication information a new session is started and the user can access their account information and settings, including menus to manage their financial control settings, at step 1106.

Later in the session, during step 1108, the provider receives a request to change one or more financial control settings. For example, the user could request to turn-on wires. That is allow wires whereas before they had been disabled. To ensure that the changes are being requested by the owner (or administrator) of the account and not an unauthorized user, the provider may request a second type of authentication at step 1110. This second type of authentication could be a more secure type of authentication. Examples include, but are not limited to: biometric authentication, two-factor authentication or other suitable security methods. In one embodiment, this second type of authentication requires a user to visually confirm his or her identify using the camera on his or her remote device. In one example, a representative of the provider may video chat the user to confirm his or her identify visually. If the user is able to successfully provide the second type of authentication, the provider will make the requested changes to the user's financial control settings.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of improving a security of financial transactions associated with a financial account of a user at a financial account provider, comprising the steps of:

establishing a communication session between a computer system of the financial account provider and a remote device of the user, by the computer system, for accessing the financial account of the user at the financial account provider;

prompting the user, by the computer system, to provide a first type of authentication;

providing the user, by the computer system, with a financial transaction control setting associated with the financial account of the user in response to receiving the first type of authentication from the user;

receiving, by the computer system, a request to change the financial transaction control setting associated with the financial account of the user and a type of financial transaction to be made by the user;

determining, by the computer system, an authentication control setting associated with the type of financial transaction to be made by the user, wherein the authentication control setting is selectable between a first setting in which a change of the financial transaction control setting may proceed with only one type of authentication and a second setting in which a second type of authentication is required for changing the financial transaction control setting;

based on the authentication control setting indicating a requirement for a second type of authentication, prompting the user, by the computer system, to provide the second type of authentication, wherein the second type of authentication requires biometric authentication information;

changing the financial transaction control setting, by the computer system, in response to at least one of receiving the second type of authentication from the user and determining the authentication control setting indicating no requirement for the second type of authentication;

preventing, by the computer system, the financial transaction control setting from being changed when the user fails to provide the second type of authentication and there is a requirement for the second type of authentication;

providing a user, by the computer system, with an account management section through the remote device of the user, wherein the account management section includes a plurality of financial control settings associated with at least one type of financial transaction that may be conducted by the user financial account, the at least one type of financial transaction having been authorized by receiving the first type of authentication, and by receiving the second type of authentication if required;

receiving, by the computer system from the remote device, a user-selected allowed geographic region for at least one of a first type of financial transaction and a second type of financial transaction from a plurality of transaction types available from the financial account provider;

in response to receiving the user-selected allowed geographic region, initiating a video chat, by the computer system, between the user and an account representative of the financial account provider to confirm that the user matches a picture of the user on file with the financial account provider; and upon confirming, by the computer system, that the user in the video chat matches the picture, granting permission, by the computer system, to the user to change the user-selected allowed geographic region.

2. The method according to claim 1, further comprising:

receiving a financial transaction request by the computer system, the financial transaction request being associated with the at least one of the first type of financial transaction and the second type of financial transaction;

retrieving, by the computer system, the user-selected allowed geographic region for the at least one of the first type of financial transaction and the second type of financial transaction from a database associated with the computer system;

receiving, by the computer system, a transaction location associated with the financial transaction request;

comparing, by the computer system, the transaction location to the user-selected allowed geographic region associated with the at least one of the first type of financial transaction and the second type of financial transaction;

denying, by the computer system, the financial transaction request when the transaction location is not located within the user-selected allowed geographic region for the first type of financial transaction; and approving, by the computer system, the financial transaction request when the transaction location is located within the user-selected allowed geographic region for the second type of financial transaction.

3. The method according to claim 2, wherein the step of retrieving the user-selected allowed geographic region associated with the at least one of the first type of financial transaction and the second type of financial transaction is preceded by a step of providing a list of geographic regions to the user in the account management section through the remote device and allowing the user to select at least one of the geographic regions.

4. The method according to claim 2, wherein the transaction location is included in a message received along with the financial transaction request.

5. The method according to claim 2, wherein the transaction location is a Global Positioning System location.

6. The method according to claim 2, wherein the first type of financial transaction is a wire transfer and the second type of financial transaction is an Automated Teller Machine withdrawal.

7. The method according to claim 2, further comprising:

confirming, by the computer system, that the remote device of the user is registered with the financial account provider; and upon confirming, by the computer system, that the user in the video chat matches the picture and confirming, by the computer system, that that the remote device of the user is registered with the financial account provider, granting permission, by the computer system, to the user to change the user-selected allowed geographic region.

8. The method according to claim 2, wherein the method further includes:

retrieving, from the database associated with the computer system, a user-selected maximum amount for a single transaction of the first type of financial transaction and the second type of financial transaction;

determining, by the computer system, a transaction amount from the financial transaction request;

comparing, by the computer system, the transaction amount to the user-selected maximum amount for the single transaction of the first type of financial transaction and the second type of financial transaction;

denying, by the computer system, the financial transaction request when the transaction amount is greater than the user-selected maximum amount for the first type of financial transaction; and allowing, by the computer system, the financial transaction request when the transaction amount is less than the user-selected maximum amount for the second type of financial transaction.

9. The method according to claim 2, wherein the method further includes:

retrieving, from the database associated with the computer system, a user-selected maximum number of transactions for a predetermined time period for the first type of financial transaction and the second type of financial transaction;

determining, by the computer system, if the number of financial transactions in the predetermined time period for the first type of financial transaction and the second type of financial transaction has exceeded the user-selected maximum number of transactions; and denying, by the computer system, the financial transaction request when the number of financial transactions in the predetermined period exceeds the user-selected maximum number of transactions for the first type of financial transaction and the second type of financial transaction.

10. A method of improving a security of financial transactions associated with a financial account of a user at a financial account provider, comprising the steps of:

establishing a communication session between a computer system of the financial account provider and a remote device of the user, by the computer system, for accessing the financial account of the user at the financial account provider;

prompting the user, by the computer system, to provide a first type of authentication;

providing the user, by the computer system, with a financial transaction control setting associated with the financial account of the user in response to receiving the first type of authentication from the user;

receiving, by the computer system, a request to change the financial transaction control setting associated with the financial account of the user and a type of financial transaction to be made by the user;

determining, by the computer system, an authentication control setting associated with the type of financial transaction to be made by the user, wherein the authentication control setting is selectable between a first setting in which a change of the financial transaction control setting may proceed with only one type of authentication and a second setting in which a second type of authentication is required for changing the financial transaction control setting;

based on the authentication control setting indicating a requirement for a second type of authentication, prompting the user, by the computer system, to provide the second type of authentication, wherein the second type of authentication requires two-factor authentication information;

changing the financial transaction control setting, by the computer system, in response to at least one of receiving the second type of authentication from the user and determining the authentication control setting indicates no requirement for the second type of authentication;
preventing, by the computer system, the financial transaction control setting from being changed when the user fails to provide the second type of authentication and there is a requirement for the second type of authentication;
providing a user, by the computer system, with an account management section through the remote device of the user, wherein the account management section includes a plurality of financial control settings associated with at least one type of financial transaction that may be conducted by the user financial account, the at least one type of financial transaction having been authorized by receiving the first type of authentication, and by receiving the second type of authentication if required;
receiving, by the computer system from the remote device, a user-selected allowed geographic region for at least one of a first type of financial transaction and a second type of financial transaction from a plurality of transaction types available from the financial account provider:
in response to receiving the user-selected allowed geographic region, initiating a video chat, by the computer system, between the user and an account representative of the financial account provider to confirm that the user matches a picture of the user on file with the financial account provider; and
upon confirming, by the computer system, that the user in the video chat matches the picture, granting permission, by the computer system, to the user to change the user-selected allowed geographic region.

11. The method according to claim 10, further comprising:
receiving, by the computer system from the remote device, a list of user-selected prohibited companies associated with at least one of the first type of financial transaction and the second type of financial transaction;
receiving a financial transaction request by the computer system, the financial transaction request being associated with a company;
retrieving, by the computer system, the list of user-selected prohibited companies associated with at least the first type of financial transaction and the second type of financial transaction from a database associated with the computer system;
comparing, by the computer system, the company to the user-selected prohibited companies associated with the at least first type of financial transaction and the second type of financial transaction;
denying, by the computer system, the financial transaction request when the company is in the list of user-selected prohibited companies and is associated with the first type of financial transaction; and
approving, by the computer system, the financial transaction request when the company is not in the list of user-selected prohibited companies and is associated with the second type of financial transaction.

12. The method according to claim 11, wherein the method further includes:
receiving a transaction location associated with the financial transaction request;
comparing, by the computer system, the transaction location to the user-selected allowed geographic region for the at least one of the first type of financial transaction and the second type of financial transaction;
denying, by the computer system, the financial transaction request when the transaction location is not located within the user-selected allowed geographic region for the first type of financial transaction; and
approving, by the computer system, the financial transaction request when the transaction location is located within the user-selected allowed geographic region for the second type of financial transaction.

13. The method according to claim 12, wherein the financial transaction control setting includes selecting allowed geographic regions where financial transactions are permitted for each of the first type of financial transaction and the second type of financial transaction.

14. The method according to claim 11, wherein the financial transaction control setting includes selecting a point of sale where financial transactions are prohibited for each of the first type of financial transaction and the second type of financial transaction.

15. A method of improving a security of financial transactions associated with a financial account of a user at a financial account provider, comprising the steps of:
establishing a communication session between a computer system of the financial account provider and a remote device of the user, by the computer system, for accessing the financial account of the user at the financial account provider;
receiving, by the computer system, a first type of authentication;
providing the user, by the computer system, with a financial transaction control setting associated with the financial account of the user in response to receiving the first type of authentication;
receiving, by the computer system, a request to change the financial transaction control setting associated with the financial account of the user and a type of financial transaction to be made by the user;
determining, by the computer system, an authentication control setting associated with the type of financial transaction to be made by the user, wherein the authentication control setting is selectable between a first setting in which a change of the financial transaction control setting may proceed with only one type of authentication and a second setting in which a second type of authentication is required for changing the financial transaction control setting;
based on the authentication control setting indicating a requirement for a second type of authentication, prompting the user, by the computer system, to provide the second type of authentication, wherein the second type of authentication requires voice authentication information;
changing the financial transaction control setting, by the computer system, in response to at least one of receiving the second type of authentication from the user and determining the authentication control setting indicates no requirement for the second type of authentication;
preventing, by the computer system, changes to the financial transaction control setting when the user fails to provide the second type of authentication and there is a requirement for the second type of authentication;
providing a user, by the computer system, with an account management section through the remote device of the user, wherein the account management section includes a plurality of financial control settings associated with at least one type of financial transaction that may be conducted by the user financial account, the at least one type of financial transaction having been authorized by receiving the first type of authentication, and by receiving the second type of authentication if required;

receiving, by the computer system from the remote device, a user-selected allowed geographic region for at least one of a first type of financial transaction and a second type of financial transaction from a plurality of transaction types available from the financial account provider;

in response to receiving the user-selected allowed geographic region, initiating a video chat, by the computer system, between the user and an account representative of the financial account provider to confirm that the user matches a picture of the user on file with the financial account provider; and upon confirming, by the computer system, that the user in the video chat matches the picture, granting permission, by the computer system, to the user to change the user-selected allowed geographic region.

16. The method according to claim 15, further comprising:

receiving a financial transaction request by the computer system, the financial transaction request being associated with at least one of the first type of financial transaction and the second type of financial transaction;

retrieving, by the computer system, the user-selected allowed geographic region for the at least one of the first type of financial transaction and the second type of financial transaction from a database associated with the computer system;

receiving, by the computer system, a transaction location associated with the financial transaction request, wherein the transaction location is included in a message received along with the financial transaction request and the transaction location is a Global Positioning System location;

comparing, by the computer system, the transaction location to the user-selected allowed geographic region associated with the at least one of the first type of financial transaction and the second type of financial transaction;

denying, by the computer system, the financial transaction request when the transaction location is not located within the user-selected allowed geographic region for the first type of financial transaction; and approving, by the computer system, the financial transaction request when the transaction location is located within the user-selected allowed geographic region for the second type of financial transaction.

17. The method according to claim 16, wherein the method further comprises confirming, by the computer system, that the remote device of the user is registered with the financial account provider.

18. The method according to claim 16, wherein the granting of permission to change the user-selected allowed geographic region comprises confirming, by the computer system, that that the remote device of the user is registered with the financial account provider.

19. The method according to claim 16, wherein the financial transaction control setting includes selecting allowed geographic regions where financial transactions are permitted for each of the first type of financial transaction and the second type of financial transaction.

20. The method according to claim 15, wherein the financial transaction control setting is set to prohibit all financial transactions of the first type, wherein the first type of financial transaction is monetary wire transfers.

* * * * *